(12) United States Patent
Shekter

(10) Patent No.: US 7,453,459 B2
(45) Date of Patent: Nov. 18, 2008

(54) COMPOSITE RENDERING 3-D GRAPHICAL OBJECTS

(75) Inventor: Jonathan Shekter, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 239 days.

(21) Appl. No.: 10/080,525

(22) Filed: Feb. 21, 2002

(65) Prior Publication Data

US 2002/0126138 A1     Sep. 12, 2002

Related U.S. Application Data

(60) Provisional application No. 60/271,759, filed on Feb. 26, 2001.

(51) Int. Cl.
*G06T 17/00* (2006.01)

(52) U.S. Cl. .................................. 345/423; 382/254

(58) Field of Classification Search ................ 345/475, 345/473
See application file for complete search history.

(56) References Cited

U.S. PATENT DOCUMENTS

| | | | | |
|---|---|---|---|---|
| 4,697,178 | A | * | 9/1987 | Heckel ........................ 345/422 |
| 5,809,219 | A | * | 9/1998 | Pearce et al. ................. 345/426 |
| 5,870,095 | A | * | 2/1999 | Albaugh et al. .............. 345/422 |
| 5,874,967 | A | * | 2/1999 | West et al. ................... 345/629 |
| 5,974,198 | A | | 10/1999 | Hamburg et al. |
| 5,990,904 | A | * | 11/1999 | Griffin ......................... 345/631 |
| 6,016,150 | A | | 1/2000 | Lengyel et al. |
| 6,064,393 | A | | 5/2000 | Lengyel et al. |
| 6,185,342 | B1 | * | 2/2001 | Hamburg et al. ............ 382/284 |
| 6,229,553 | B1 | | 5/2001 | Duluk, Jr. et al. |
| 6,396,959 | B1 | * | 5/2002 | Hamburg ...................... 382/276 |
| 6,426,755 | B1 | * | 7/2002 | Deering ........................ 345/581 |
| 6,504,550 | B1 | | 1/2003 | Schlapp |
| 6,618,054 | B2 | * | 9/2003 | Deering ........................ 345/581 |
| 7,133,041 | B2 | * | 11/2006 | Kaufman et al. ............. 345/419 |
| 2002/0097241 | A1 | * | 7/2002 | McCormack et al. ........ 345/423 |

FOREIGN PATENT DOCUMENTS

EP     827112 A2 *  3/1998

(Continued)

OTHER PUBLICATIONS

The A-buffer, an Antialiased Hidden Surface Method. Loren Carpenter. Computer Graphics. vol. 18, No. 3. Jul. 1984.*

(Continued)

*Primary Examiner*—Ulka Chauhan
*Assistant Examiner*—Peter-Anthony Pappas
(74) *Attorney, Agent, or Firm*—Fish & Richardson P.C.

(57) ABSTRACT

Methods and apparatus for 3-D image compositing. The compositing system can be used to render 3-D objects together to a scene, to combine together separately rendered 3-D objects in a scene including previously rendered objects, or to render some objects together while separately rendering and combining together other objects in a scene. The system correctly handles image processing effects including anti-alias, motion-blur and depth-of-field effects in all regions of the scene, including regions where the objects within the scene intersect. The resulting scenes have the same high image quality regardless of which image objects are rendered together and which are later combined or composited to the final image.

55 Claims, 6 Drawing Sheets

FOREIGN PATENT DOCUMENTS

| | | | |
|---|---|---|---|
| EP | 1050852 A2 | * | 11/2000 |
| JP | 5-28280 | | 5/1993 |
| JP | 10-134171 | | 5/1998 |
| JP | 2000-155845 | | 6/2000 |

OTHER PUBLICATIONS

Computer Graphics: Principles and Practice. Foley et al. Addison-Wesley. 1997. p. 874-875.*
Foley et al. Computer Graphics: Principles and Practice. Addison-Wesley Publishing Company, Inc. 1997. p. 886-893.*
Effective Cache Mechanism for Texture Mapping. IBM Technical Disclosure Bulletin. Volume 39. Issue 12. Dec. 1996.*
Tom Duff, "Compositing 3-D Rendered Images," SIGGRAPH 1988, vol. 19, No. 3, 1985.
John Snyder and Jed Lengyel, "Visibility Sorting and Compositing for Image-Based Rendering," Apr. 2, 1997, Technical Report MSR-TR-97-11, Microsoft Corporation, Redmond, Washington.
Kaneko, "Part 4 3D Algorithm", C Magazine, Oct, 2000, pp. 44-57- (English Translation).
Kawanishi, "OpenGL and 3D Graphics", Nikkei Computer Graphics, Dec. 8, 1996, pp. 106-113.
Sachio Tanaka, Japanese Patent Office, Translation of office action in corresponding Japanese application No. 2002-568314, Aug. 28, 2007, 3 pages.
Kaneko, "Part 4 3D Algorithm", C Magazine, Oct., 2000, pp. 44-57.
Sachio Tanaks, Japanese Patent Office, Translation of office action in corresponding Japanese application no. 2002-568134, Apr. 22, 2008, 2 pages.

* cited by examiner

COMPOSITE RENDERING 3-D GRAPHICAL OBJECTS

CROSS REFERENCE TO RELATED APPLICATIONS

This application claims the benefit of U.S. Provisional Application Ser. No. 60/271,759 filed on Feb. 26, 2001.

BACKGROUND

This invention relates to methods for composite rendering of 3-dimensional ("3-D") graphical objects.

In the field of graphic arts, much effort is spent creating realistic looking images of objects in a virtual world. In order to view the objects in the virtual world from an arbitrary vantage point, the objects must be stored as 3-D objects. These 3-D objects can then be rendered to 2-D images or scenes appropriate for display on an output device such as a printer or monitor using a variety of 3-D rendering algorithms. Many 3-D rendering algorithms include image processing effects that add realism to the rendered 2-D scenes including anti-aliasing, motion-blur, and depth-of-field effects. Notably, however, all of the algorithms that allow a 3-D scene to be rendered with combined anti-aliasing, motion-blur, and depth-of-field effects, require the individual components of the scene to be rendered together in the same rendering step.

A current goal of 3-D rendering is to develop a 3-D image compositing technique that would allow separately rendered 3-D objects to be seamlessly integrated into realistic looking composite scenes. The advantages of developing such a 3-D image compositing technique are obvious. The technique would allow 3-D images and objects from different sources made at different times to be seamlessly integrated into arbitrary composite scenes. It would allow objects easily to be added to and removed from a scene without having to re-render the entire scene. It would also allow for objects to be separately created, rendered, and realistically used and re-used in a multitude of different scenes.

While there has been some work in the field of 3-D image compositing, and while some commercial 3-D compositing systems have recently come into use, no system has been able successfully to incorporate all of the image processing effects that would allow realistic looking 3-D composited scenes to be created. In particular, the effects of anti-aliasing, motion-blur, and depth of field have not been successfully incorporated into any 3-D image compositing system such that a composited image produced by the system is of the same quality as can be achieved by rendering all of the separately composited image elements together using a standard 3-D rendering system. Recently, the anti-aliasing problem has been solved; however, there is no current solution for motion blur and depth-of-field effects of separately composited objects, specifically with respect to intersecting objects.

SUMMARY

The invention provides a 3-D image compositing system that allows 3-D objects to be separately rendered and combined together in a realistic-looking composite image or scene having all of the image processing effects that add realism to the scene such as anti-aliasing, motion-blur, and depth of field effects. The resulting scenes have the same high image quality regardless of which image objects are rendered together and which are later combined or composited to the final image. The system can be used as an ordinary 3-D renderer to render 3-D objects together in a scene, or as a 3-D composite renderer to combine separately rendered 3-D objects into a scene and to correctly include anti-alias, motion-blur and depth-of-field effects at the intersections of objects within the scene.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
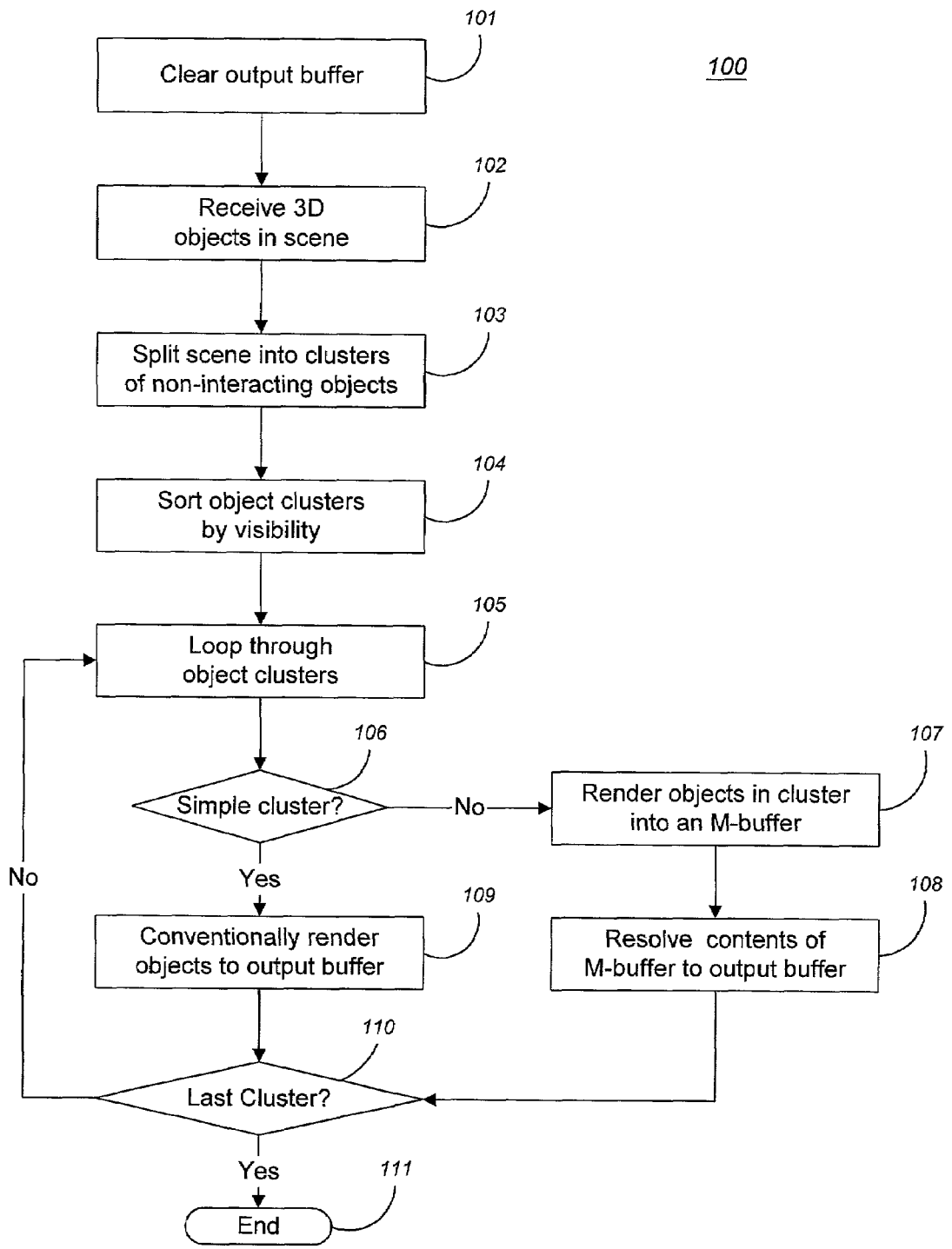
FIG. 1 is a flowchart depicting a method for rendering a 3-D object according to one embodiment of the present invention.

A method 100 for composite rendering a scene containing 3-D graphical objects is shown in FIG. 1. In preparation for rendering the scene, an application performing the method 100 clears (step 101) an output raster buffer in which the scene will be rendered, and then receives (step 102) a plurality of 3-D objects to be displayed in the scene.

The application then splits the scene (step 103) into non-interacting object clusters. A non-interacting object cluster is a cluster of objects that do not interact with each other or with any other cluster of objects, and for which there is a unique drawing order that gives correct visibility from a particular camera position for all objects in the cluster. Object clustering can be performed using any known clustering technique such as bounding boxes or binary space-partitioning (BSP). In general, objects can be separated into object clusters whenever separating planes can be found to separate the objects from other objects or object clusters. It is worth noting that the object clustering step 103 is performed in method 100 merely to increase the efficiency of the disclosed 3-D composite rendering algorithm, and that the 3-D composite rendering algorithm can be effectively implemented with or without the object clustering step, and neither requires nor depends upon having an object clustering step.

Once the application identifies the object clusters in the scene, it sorts them (step 104) according to their visibility so that the least visible or most obscured objects will be rendered first, and the most visible or least obscured objects will be rendered last. Again, any of the well-known object visibility sorting algorithms such as the BSP algorithm or the depth-sort algorithm can be used to sort the objects in the identified object clusters. Once all of the objects in all of the object clusters have been visibility sorted, the application loops through the object clusters (steps 105-110), and separately renders all of the objects in both the simple object clusters (step 109) and the non-simple object clusters (steps 107-108) before exiting (step 111).

In the process of rendering all of the objects in all of the object clusters, the application tests (step 106) whether a given object cluster is a simple cluster or a non-simple cluster. An object cluster is simple if it consists entirely of objects and object primitives that do not overlap in the screen space of the object cluster. The screen space is that portion of the output buffer or camera image plane that is occupied by the object cluster, or into which the object cluster is rendered.

If an object cluster is simple, the object primitives in the cluster are rendered (step 109) or scan-converted to the output buffer as a series of composite layers using any conventional 3-D rendering algorithm that is capable of anti-aliasing, motion-blurring, and depth-of-field blurring the object primitives. In one implementation, different 3-D rendering algorithms are used in step 109 to render different types of object primitives, since no single 3-D rendering algorithm is "best" able to render any and all object primitive types.

If an object cluster is non-simple, the object primitives of the objects in the cluster are rendered (step 107) to a motion buffer or M-buffer 200 (see FIG. 2) that is subsequently resolved (step 108) so that the object primitives are composited with the contents of the output buffer. As with the object primitives in simple object clusters, different 3-D rendering algorithms can be used to render the object primitives in non-simple object clusters to M-buffer 200. The rendering algorithms must be able to anti-aliase, motion-blur, and depth-of-field blur the rendered object primitives. They must also be capable of generating the information needed by M-buffer 200 and of either writing the required information directly to M-buffer 200 or of outputting the information so that the application can write it to M-buffer 200. In step 207, some of the object primitives in the non-simple object cluster may have previously been rendered to an M-buffer. These object primitives can be read from that M-buffer and written directly to M-buffer 200 without being re-rendered by a 3-D rendering algorithm. In this way, pre-rendered object primitives can be added to a scene without having to be re-rendered by compositing them with the other object primitives rendered to M-buffer 200.

Figure 2:
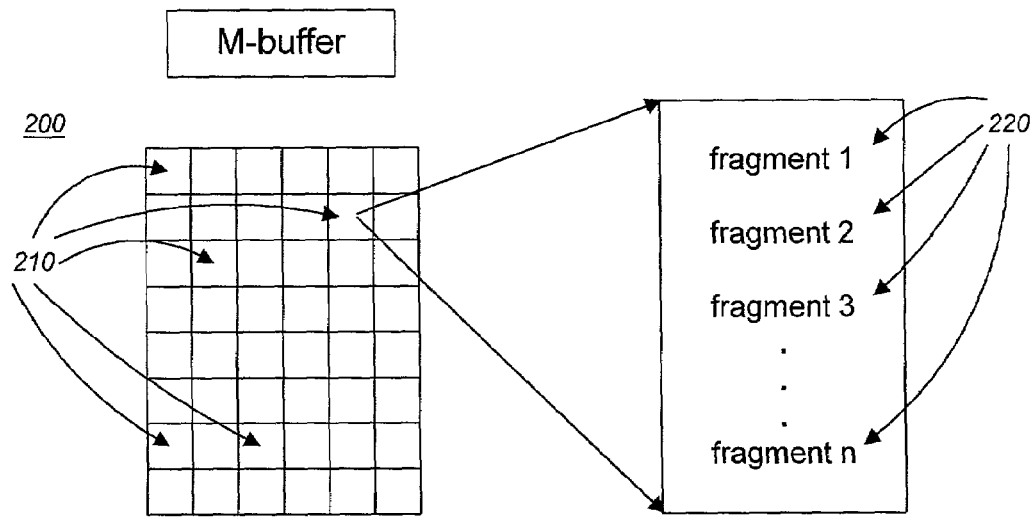
FIG. 2 is a schematic illustration of the structure of an M-buffer according to one embodiment of the present invention.

Before describing a method by which the object primitives of objects in non-simple object clusters are rendered to M-buffer 200, a discussion of the contents of M-buffer 200 is useful. As shown in FIG. 2, M-buffer 200 can be implemented as an array of linked lists 210 having a one-to-one correspondence with the pixels in the screen space that is occupied by the non-simple object cluster that is rendered to M-buffer 200. That is to say, since M-buffer 200 is filled with the rendered contents of a non-simple object cluster, there can be as many linked lists 210 in M-buffer 200 as there are pixels in the non-simple object cluster's screen space. Thus, if a non-simple object cluster has a screen space occupying ¼ of an output buffer, its associated M-buffer 200 can have enough linked lists 210 to correspond in a one-to-one fashion with the ¼ of the output buffer pixels that are filled by the object cluster's screen space.

Each linked list 210 in an M-buffer 200 can contain from zero to n pixel fragments 220, where n is typically the number of objects in the non-simple object cluster that is rendered into M-buffer 200. However, because some objects can have more than one object primitive rendered to a pixel, and because some object primitives can be rendered to a pixel at multiple depths, there is not necessarily a one-to-one correspondence between the number of pixel fragments and the number of objects in the non-simple object cluster. When no objects are rendered to an output buffer pixel, the pixel's corresponding linked list 210 is a null list that contains zero pixel fragments 220. When a single object is rendered to an output buffer pixel, the pixel's corresponding linked list 210 typically contains a single pixel fragment 220 that stores information about the object's properties at that pixel. When two or more objects are rendered to an output buffer pixel, the pixel's corresponding linked list 210 typically contains two or more pixel fragments 220 that respectively store information about the properties of the two or more objects co-occupying that pixel.

Figure 3:
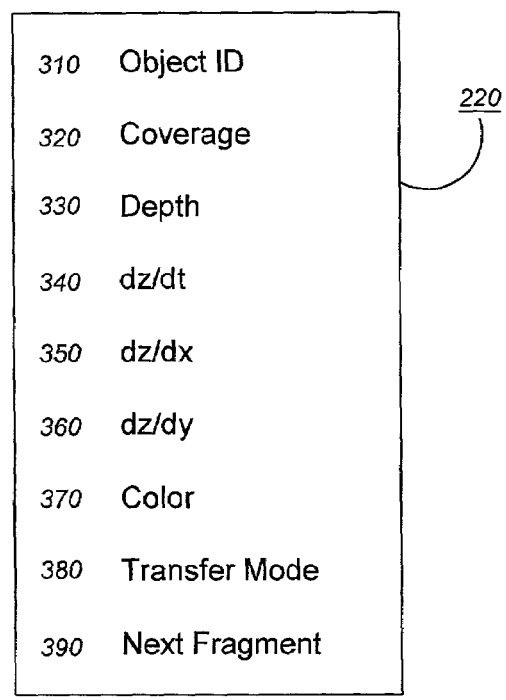
FIG. 3 is a schematic illustration of the contents of an M-buffer pixel fragment according to one embodiment of the present invention.

As further shown in FIG. 3, the pixel fragments 220 of a linked list 210 store information about the local properties of the objects that are rendered to the output buffer pixel that corresponds to linked list 210. The information stored in a pixel fragment 220 can include the following: the object ID 310 of an object primitive that at least partially occupies the output buffer pixel that corresponds to linked list 210; the object primitive's coverage 320 of the output buffer pixel; the object primitive's depth 330 or z-position in the output buffer pixel; the object primitive's z-component of velocity or dz/dt 340 in the output buffer pixel; the orientation dz/dx 350 and dz/dy 360 of the surface of the object primitive relative to the plane of the output buffer pixel; the object primitive's color 370 and transfer mode 380; and a pointer 390 to the next pixel fragment in linked list 210, if any, that stores the information of another object primitive that at least partially occupies the output buffer pixel that corresponds to link list 210.

In general, the amount and type of information stored in a pixel fragment 220 of a linked list 210 depends upon the number and types of 3-D composite rendering features or image processing effects a user wishes to apply. At a minimum, a pixel fragment 220 must store an object's coverage 320, depth or z-position 330, color 370 and transfer mode 380. This minimal pixel fragment 220 permits simple depth sorting of the object primitives rendered to each linked list 210, but does not allow correct anti-aliasing, motion-blurring, or depth-of-focus blurring of the intersections between two or more object primities that have been rendered and stored in linked list 210.

The object ID 310 of an object primitive that has been rendered to an M-buffer is generally stored in pixel fragments 220 to prevent discontinuities from appearing between object primitives belonging to the same object. The stored object ID's 310 can also be used to indirectly determine an object primitive's transfer mode 380, which can be conveniently stored in a look-up table indexed by object ID 310 for that purpose. Alternatively, transfer mode 380 can be directly stored in pixel fragments 220.

Transfer modes 380, also known as blend modes, are compositing controls that determine how to mix the color 370 of a pixel fragment 220 in a linked list 210 with the accumulated color of the output buffer pixel that corresponds to the linked list 210, where the accumulated color of the output buffer pixel is the color that results from blending all of the colors 370 of the underlying pixel fragments 220, if any, in linked list 210. Further information on transfer modes and compositing controls may be found in commonly-owned U.S. Pat. No. 5,974,198 issued Oct. 26, 1999 to Hamburg et al. for "Adjustment Layers for Composited Image Manipulation", which is incorporated herein by reference.

The coverage 320 of a pixel fragment 220 belonging to a linked list 210 is the time-averaged area of the output buffer pixel that corresponds to linked list 210 that is occupied by an object primitive that has been rendered to pixel fragment 220. The time average is taken over the shutter-interval of a virtual camera that is deemed to have recorded the image or scene, where the shutter-interval is the unit of time during which the shutter of the virtual camera is open. During a shutter-interval, moving objects in the virtual world can move within the scene being recorded. As a result, the scene records a time-averaged exposure of the objects in the virtual world over a time interval corresponding to the shutter-interval. This time averaged exposure results in motion-blur of the objects that are moving in the scene. The faster an object is moving, the more it is motion-blurred. Because the area of a pixel that is occupied by an object primitive can change over the shutter-interval recorded in a scene, pixel fragments 220 store a rendered object primitive's time-averaged area or coverage 320 of an output buffer pixel. In this way, pixel fragments 220 record the motion-blur of objects that are moving in the plane of the output buffer pixels.

The depth 330 or z-position of a pixel fragment 220 belonging to a linked list 210 is the distance from a virtual camera recording a scene to the surface of an object primitive that corresponds to the pixel fragment 220. The depth is used to sort the pixel fragments 220 in a linked list 210 from the most distant to the nearest rendered object primitive. Since the depth or z-position of an object primitive's surface need not be single-valued over the entire area of the output buffer pixel corresponding to linked list 210, or over the shutter-interval, the depth 330 that is recorded in pixel fragment 220 can be any of a number of reasonable measures of the rendered object primitive's z-position. For example, the depth could be a measure of the object primitive's z-position at the center of the output buffer pixel or at one of the output buffer pixel's corners at a given instant of time. Or, the depth could be a time-averaged measurement at one of these positions over the shutter-interval. Similarly, the depth could be a measure of the rendered object primitive's average z-position over the area of the pixel at a given instance of time, or averaged over the shutter interval. In one implementation, the depth is a measure of the z-position of an object primitive's surface at the bottom-left corner of an output buffer pixel at the start of a frame or at the instant the virtual camera shutter opens.

The color 370 of a pixel fragment 220 belonging to a linked list 210 is the color of an object primitive that has been rendered to the pixel fragment 220. The color 370 stored in a pixel fragment 220 is used with the pixel fragment's transfer mode 380 to blend the pixel fragments color with the colors from all of the pixel fragments 220 in a linked list 210 when the output buffer pixel that corresponds to linked list 210 is rendered by resolving M-buffer 200. As with an object primitive's depth, an object primitive's color need not be single-valued over the area of the output buffer pixel or over the shutter-interval. Consequently, any reasonable measure of the object primitive's color can be stored in pixel fragment color 370. In one implementation, the color is the coverage-weighted average color of the rendered object primitive over the output buffer pixel. In other words, the pixel fragment color 370 is the average rendered color of the object primitive over both the spatial extent of the output buffer pixel, and the temporal extent of the shutter-interval.

As previously mentioned, two or more separately rendered 3-D object primitives can be composited to an output buffer pixel corresponding to a linked list 210 using a simple depth sort of the linked list's pixel fragments 220, provided that each fragment in linked list 210 stores at least each object primitive's object ID 310 (or transfer mode 380), coverage 320, depth 330, and color 370. However, when all pixels are so composited, the resulting composite image is not properly anti-aliased, motion-blurred, or depth-of-focus blurred at any intersections between the two or more objects.

To correctly anti-alias the rendered 2-D intersection between two or more objects, whether moving or not, information about the surface geometry of the intersecting objects must be known. In one implementation, the surface geometry of an object rendered to an output buffer is approximated by a series of planes, where each plane approximates the object's local surface geometry over an output buffer pixel. Other surface geometry approximations can be made however. For example, the surface geometries of objects can be approximated by the upper or lower surfaces of hyperboloids or other 3-dimensional geometric objects or functions.

When the surface geometry of an object is approximated by a series of planes, the orientation of a plane representing a given object primitive to be rendered to a given output buffer pixel can be stored in the pixel fragment 220 that corresponds to the object primitive, and that is part of the linked list 210 that corresponds to the output buffer pixel. The orientation of the plane can be described and stored in any of a variety of ways. For example, it can be stored as the components of a unit vector that is normal to the surface of the plane, or as a pair of slopes dz/dx and dz/dy that correspond to the slopes of the plane. As with a rendered object primitive's color 370 and depth 330, the slopes dz/dx and dz/dy of an object primitive's representative plane are not necessarily single-valued over the entire area of the output buffer pixel or over the shutter-interval of the scene. Consequently, any reasonable measure of the slopes of a representative plane can be stored in the orientation dz/dx 350 and dz/dy 360 of pixel fragment 220. In one implementation, the orientation dz/dx 350 and dz/dy 360 is the coverage-weighted orientation, or the average value of dz/dx 350 and dz/dy 360 of the object primitive's tangential planes over the spatial extent of the output buffer pixel and the temporal extent of the shutter-interval.

To correctly motion-blur the intersections between two or more objects composited by depth or z-position when one or more of the objects are moving in the z-direction, the z-component of velocity or dz/dt of each object moving in the z-direction at each output buffer pixel must be stored. For a given object primitive rendered to a given output buffer pixel, the object primitive's dz/dt 340 can be stored in the pixel fragment 220 that corresponds to the object primitive, and that is part of the linked list 210 that corresponds to the output buffer pixel. As with an object primitive's rendered color 370 and depth 330, the z-component of velocity of a rendered object primitive's surface is not necessarily single-valued over the area of the output buffer pixel or the shutter-interval of the scene. Consequently, any reasonable measure of a rendered object primitive's z-component of velocity can be stored in pixel fragment velocity dz/dt 340. In one implementation, the z-component of velocity is the coverage-weighted average dz/dt of the rendered primitive's surface, or the average value of dz/dt over the spatial extent of the output buffer pixel, and the temporal extent of the shutter-interval.

Now that the contents of M-buffer 200, linked lists 210, and pixel fragments 220 have been explained, a method by which the object primitives of objects in non-simple object clusters can be rendered to M-buffer 200 can be explained. As shown in FIGS. 1 and 2, non-simple object clusters are rendered or scan-converted in step 107 into linked lists 210 in an M-buffer 200. The linked lists 210 are later resolved (step 108) to an output raster buffer. One method 400 for scan-converting a non-simple object cluster into an M-buffer 200 is shown in FIG. 4.

Figure 4:
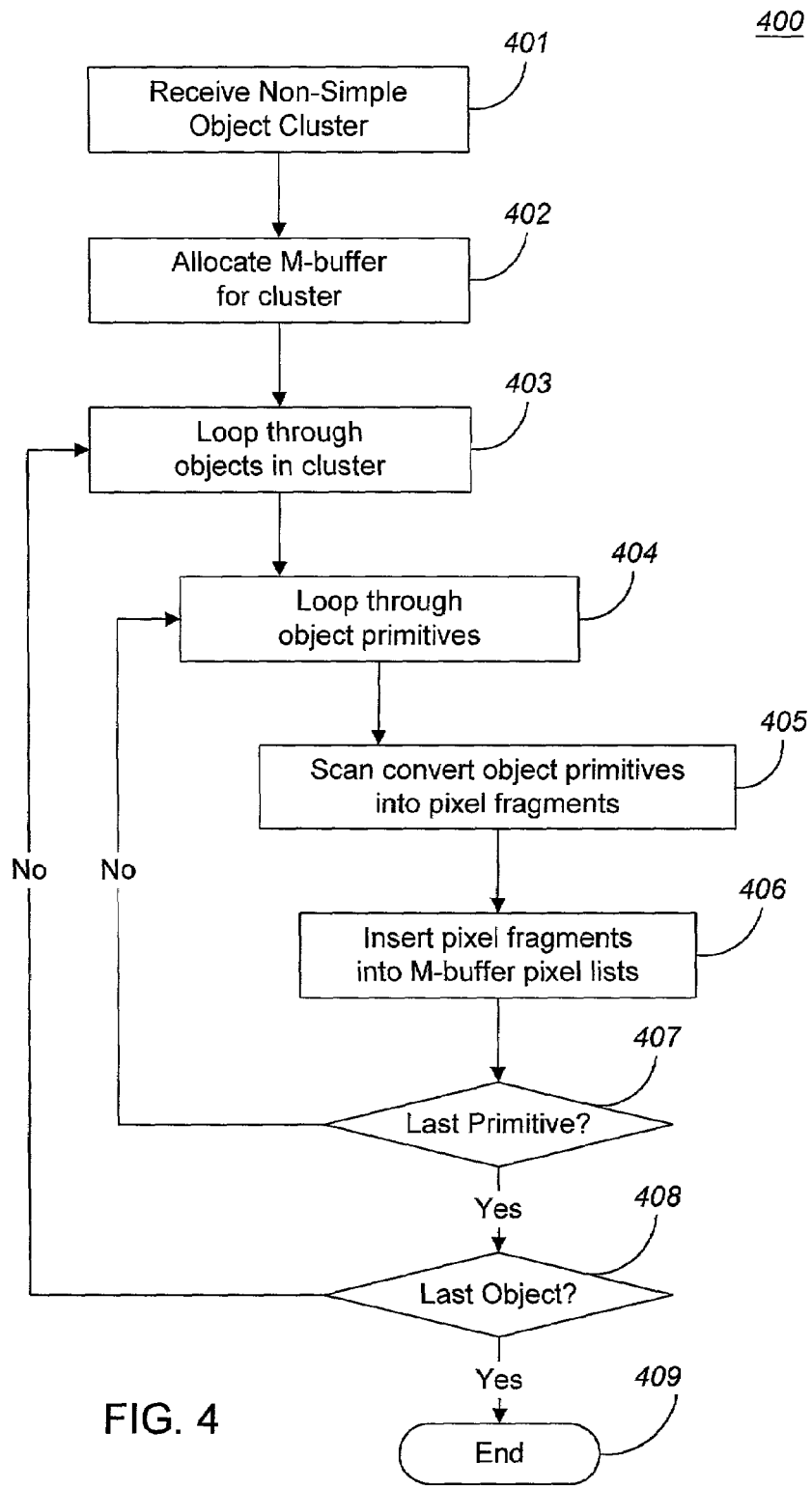
FIG. 4 is a flowchart depicting a method for rendering an object cluster to an M-buffer according to one embodiment of the present invention.

In FIG. 4, a process 400 receives (step 401) a non-simple object cluster, and allocates (step 402) sufficient memory to hold the contents of the object cluster in an M-buffer 200. The process then loops through all of the objects in the cluster (steps 403-408), and for each object loops through all of that object's primitives (steps 404-407). For each object primitive the process scan-converts (step 405) the object primitive into a plurality of pixel fragments 220 that can have a one-to-one correspondence with the pixels in the output raster buffer onto which the object primitive will eventually be composited. In addition, process 400 inserts (step 406) the plurality of pixel fragments 220 into a corresponding plurality of linked lists 210 in M-buffer 220. Like the pixel fragments 220, the linked lists 210 can be in a one-to-one correspondence with the pixels in the output raster buffer onto which the object primitive will eventually be composited. In one implementation the process inserts the plurality of pixel fragments 220 into the corresponding plurality of linked lists 210 in depth sorted order.

Figure 5:
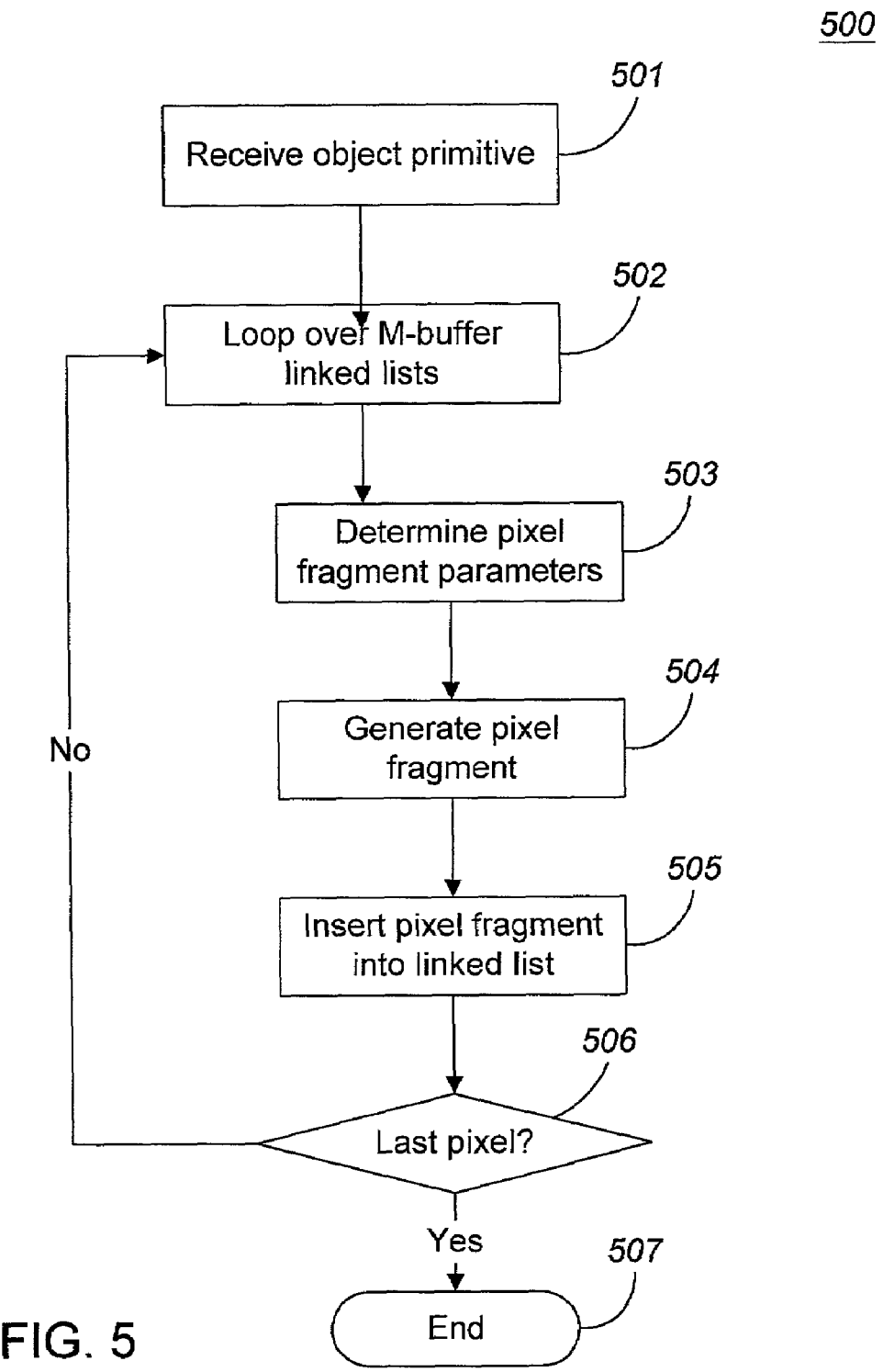
FIG. 5 is a flowchart depicting a method for scan-converting object primitives into M-buffer pixel fragments according to one embodiment of the present invention.

A process 500 that is capable of scan-converting an object primitive into a plurality of pixel fragments 220, and inserting the pixel fragments into a corresponding plurality of linked lists 210 is shown in FIG. 5. The process 500 receives (step 501) an object primitive, then loops (steps 502-506) over the linked lists 210 in the M-buffer into which the object primitive will be scan-converted. When the linked lists 210 in M-buffer 200 are in a one-to-one correspondence with the pixels in the output raster buffer into which the object primitive will eventually be composited, the loop 502-506 over linked lists 210 can equally be a loop over the pixels in the output raster buffer. For each linked list 210 or output buffer pixel, process 500 determines (step 503) the pixel fragment parameters for the object primitive, generates (step 504) a pixel fragment 220 for the object primitive, and inserts (step 505) the pixel fragment 220 into the linked list 210. The object primitive pixel fragment parameters are the local properties of the object primitive at the pixel currently being processed in pixel loop 502-506 such as the object primitive's coverage 320, depth 330, and color 370. As previously mentioned these properties can be determined by any 3-D rendering algorithm that is capable of either writing the information directly to M-buffer 200, or of outputting the information to the process executing algorithm 500 so that the process can directly write the information to M-buffer 200.

Referring again to FIG. 1, once all of the objects in a non-simple object cluster have been rendered to M-buffer 200, the M-buffer 200 can be resolved (step 108) and its contents composited to the output raster buffer. The resolution of M-buffer 200 is straight-forward when none of the surfaces of the separately rendered object primitives corresponding to the pixel fragments 220 in a linked list 210 intersect over the output buffer pixel corresponding to linked list 210. When none do, the M-buffer resolution process simply amounts to traversing the pixel fragment list 220, in order of decreasing depth, and blending the color 370 of each pixel fragment 220 with the color of the output buffer pixel using the pixel fragment's transfer mode 380 and coverage 320. The pixel fragment's coverage 320 acts as the "alpha" channel in the blending operation whenever the blending operation or transfer mode 380 requires such a channel.

When two or more surfaces of separately rendered object primitives corresponding to two or more respective pixel fragments 220 in a linked list 210 intersect over the output buffer pixel that corresponds to linked list 210, blending each fragment's color 370 to the color of the output buffer pixel becomes more difficult because the proper color blending order changes over the spatial extent of the pixel. For example, when two object primitives A and B intersect over an output buffer pixel, object primitive A is above B for a certain fraction of the pixel's time-averaged area or coverage $f_A$ while object primitive B is above A for the remaining fraction of the pixel's time-averaged area or coverage $f_B=(1-f_A)$. If object primitives A and B have corresponding pixel fragments 220 having respective colors 370a and b, the colors 370a and b can be correctly blended by taking a weighted average of two blended colors. The first blended color, weighed by fraction $f_A$, is obtained by blending color 370b with the output pixel color and then blending color 370a with the result. The second blended color, weighed by fraction $f_B=(1-f_A)$ is obtained by blending color 370a with the output pixel color and then blending color 370b with the result. Of course this complex blending of fragment colors 370 utilizes the fragment's transfer modes 380 and coverage 320 as before.

The coverage fractions $f_A$ and $f_B$ of two object primitives intersecting over a pixel can be calculated from the information stored in each object primitive's corresponding pixel fragment 220. In particular, the coverage fractions can be calculated from the information in pixel fragment 220 representing each object primitive's surface geometry over the pixel, and the rate of change of that surface geometry. When the surface geometry of an object primitive over a pixel is approximated by a plane, the coverage fractions of each of the object primitives intersecting over a pixel can be calculated from the each object primitive's orientation dz/dx 350 and dz/dy 360, and from each object primitive's z-component of velocity dz/dt 340. The planes representing the two intersecting object primitives will themselves intersect in a line, and if either object is moving this intersecting line will move with time. The projection of this moving line onto the surface of the pixel over which the object primitives intersect divides the pixel into two areas that change with time. Object A overlaps object B in one of these areas, while object B overlaps object A in the other. By time averaging these areas over the shutter-interval, the proper coverage fractions $f_A$ and $f_B$ of each object primitive can be computed.

When three or more object primitives intersect over an output buffer pixel, the proper blended color of the output buffer pixel can be determined by separately blending the colors of the three or more object primitives with the output buffer pixel color in the proper order, and then weighting the resulting separately blended colors with the appropriately computed fractional coverages $f_i$ as described above. However, in order to reduce the combinatorics of the calculation, in one implementation the following approximate method is used to calculate the color of the output buffer pixel. First, the colors 370 of the bottom two fragments 220 as measured by fragment depth 330 are blended with the output buffer pixel color according to their coverage fractions $f_A$ and $f_B$ as described above. The bottom two fragments 220 are then merged into a pseudo-fragment whose color is the weighted average color of the two fragments 220 with weights given by coverage fractions $f_A$ and $f_B$. The orientation dz/dx 350 and dz/dy 360 and z-component of velocity dz/dt 340 of the pseudo-fragment is taken to be the orientation and z-component of velocity of the fragment 220 that projects the furthest in the z-direction. This ensures that the top-most fragment will always be at least partially visible in the final output buffer pixel. Next, the color of the pseudo-fragment and of the next fragment 220 in depth 330 sorted order are blended with the output buffer pixel color, and a new pseudo-fragment is generated. This process is repeated until the color 370 of the last or top-most pixel fragment 220 is blended with the output buffer pixel color. Following this algorithm, no more than two pixel fragments 220 or pseudo-fragments are ever considered simultaneously.

Figure 6:
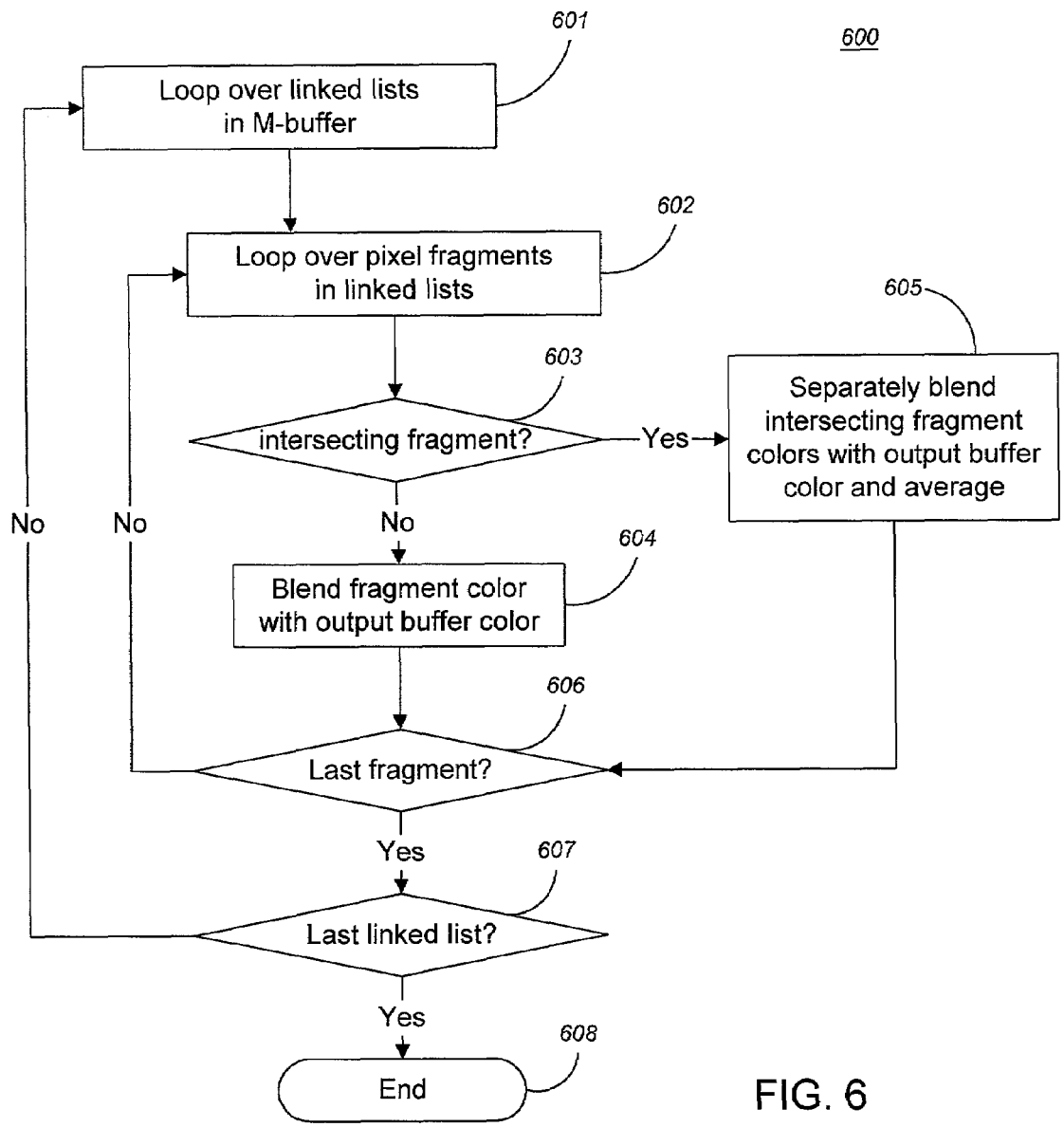
FIG. 6 is a flowchart depicting a method for resolving an M-buffer according to one embodiment of the present invention.

One method 600 for resolving M-buffer 200 according to the algorithm disclosed above is shown in FIG. 6. A process 600 loops (steps 601-607) over the linked lists 210 in M-buffer 200, and for each linked list 210 loops (steps 602-606) over the pixel fragments 220 in the list. For each pixel fragment 220 in a linked list 210, the process checks (step 603) whether the object primitive corresponding to the pixel fragment 220 intersects any other object primitives over the output buffer pixel corresponding to linked list 210. If it does not, the process simply blends (step 604) the pixel fragment's color 370 with the output buffer pixel's color using the pixel fragment's transfer mode 380 and coverage 320. However, if the object primitive corresponding to the pixel fragment 220 intersects one or more object primitives over the output buffer pixel corresponding to linked list 210, the fragment colors 370 of the two or more pixel fragments 220 corresponding to the two or more intersecting object primitives are separately blended (step 605) with the output buffer pixel color, and the resulting colors are averaged together using the fractional coverage-weighted average described above. When the color 370 of the last pixel fragment 220 of the last linked list 210 has been blended, the process exits (step 608).

The final image processing effect that can be simulated in resolving M-buffer 200 is depth-of-field correction of the intersection of separately rendered objects. This correction is done to simulate the blurring of objects that are not in the focal plane of the lens of the virtual camera that is recording the image being rendered. The correction can be done by rendering the image without depth-of-field correction, and then averaging each pixel's color in the rendered image with the colors of its neighboring pixels. This method is computationally intensive, however, and also prohibits rendering each linked list 210 in M-buffer 200 independently of every other linked list.

Figure 7:
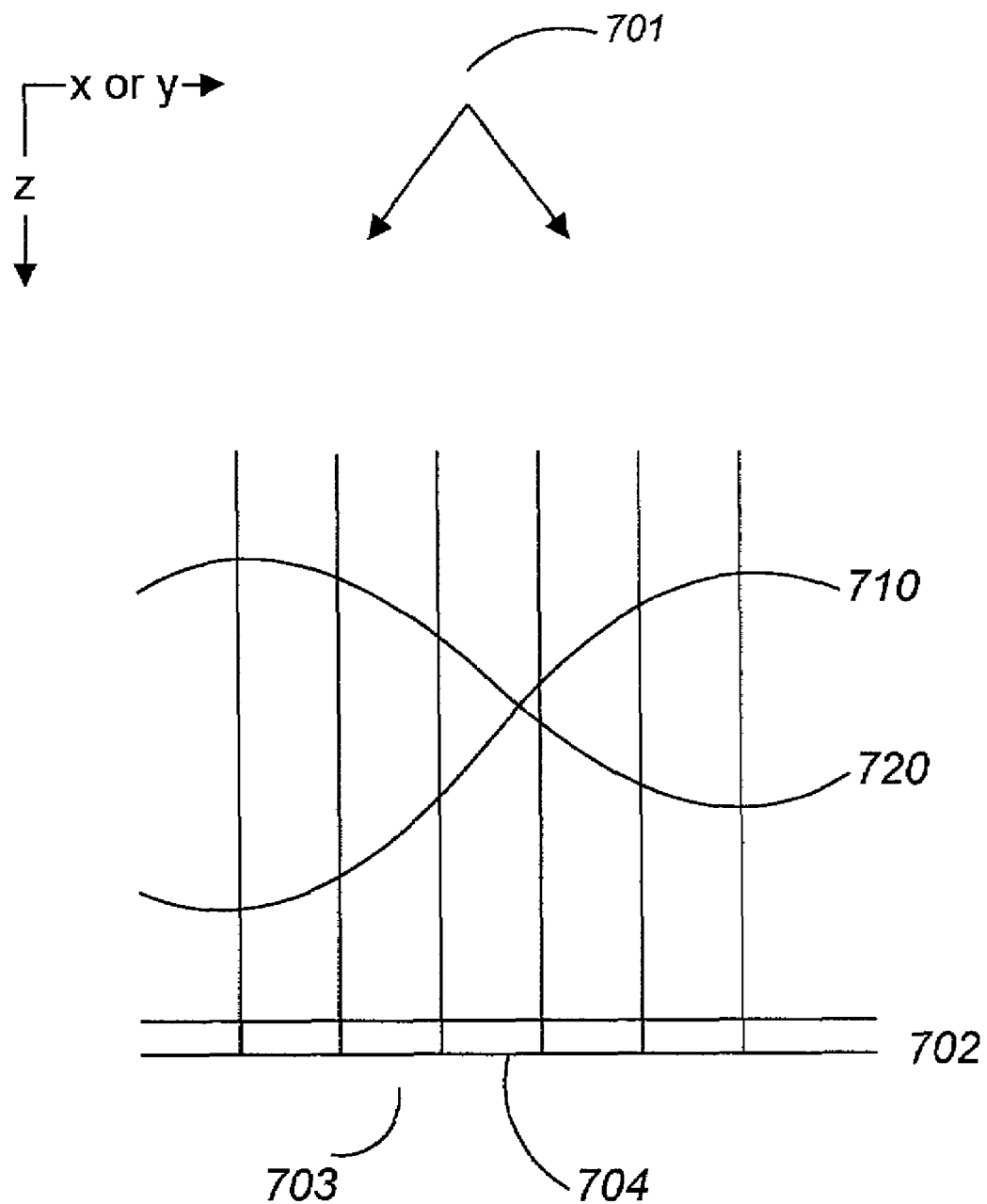
FIG. 7 is a schematic illustration of a method for correcting two separately rendered and composited objects for depth-of-field effects.

One method of simulating depth-of-field corrections in separately composited 3-D images which allows for separate rendering of each linked list 210 in M-buffer 200 independently of every other linked list in the M-buffer is disclosed in FIG. 7. As shown in FIG. 7, two objects 710 and 720 viewed through the lens of a virtual camera 701 can be separately rendered into an M-buffer 200 that corresponds to output raster buffer 702. The objects 710 and 720 can be separately rendered into pixel fragments 220 in linked lists 210 of M-buffer 200 as described above by any conventional 3-D rendering algorithm that can correctly simulate the object's depth-of-field correction.

When the objects are later separately composited by resolving M-buffer 200, the depth-of-field correction for the composited object will be correctly simulated in those pixels over which the separately rendered objects 710 and 720 actually intersect. The depth-of-field correction will also be correctly simulated in those pixels that are far away from the pixels over which the separately rendered objects 710 and 720 actually intersect, i.e. in those pixels that are further away than the radius of the depth-of-field blur. However, the depth-of-field correction for the composited object will be poorly simulated in those pixels that are near the pixels over which the separately rendered objects 710 and 720 actually intersect, i.e. those pixels that are within the radius of the depth-of-field blur. The correction is poor for nearby pixels because there is no blending of the colors between the separately composited objects like one would would expect as a result of the depth-of-field blur. In other words, the color of pixels that are near an intersection between two or more separately composited objects and within the radius of the depth-of-field blur will fail to be a blend of the colors of the intersecting objects.

To correctly simulate the depth-of-field corrections in pixels that are near the intersection of separately rendered object surfaces, each separately rendered object's surface is extended beyond the pixel area to which the pixel fragment corresponds. As shown in FIG. 7, the surfaces of objects 710 and 720 over pixel 703 can be represented in pixel fragments 220 by the orientations dz/dx 350 and dz/dy 360 of planes 711 and 721 as discussed above. Planes 711 and 721 can then be extended beyond pixel area 703 by an amount that is proportional to the size of the depth-of-field correction to be simulated. The size of the depth-of-field correction is a function of the distance of objects 710 and 720 from the focal plane of the lens of virtual camera 701, and determines the area over which a point object's color will be diffused by the depth-of-field effect. The distance of objects 710 and 720 from the focal plane of the lens of virtual camera 701 can be determined from the depths 330 of objects 710 and 720 as recorded in pixel fragments 220. The surface geometries of objects 710 and 720 can then be extended over this area using the orientations dz/dx 350 and dz/dy 360 of planes 711 and 721. As a result, extended planes 711 and 721 will appear to intersect over pixel 703, even though corresponding object surfaces 710 and 720 do not. In this way, the apparent intersection of objects 710 and 720 has been spread to those pixels that are near the pixels in which the objects actually intersect. The composite color of separately rendered objects 710 and 720 in output buffer pixel 703 can then be computed as if the objects actually intersected over output buffer pixel 703 using the method described in FIG. 6 and the geometry of extended planes 711 and 721. In this way, the depth-of-field effect or blur is applied to pixels that are near pixels over which the separately composited objects actually intersect.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications can be made without departing from the spirit and scope of the invention. For example, pixel fragments can be organized in data structures other than linked lists, as long as the fragments for each pixel can be recovered in a depth sorted order.

While the invention has been described as rendering data to an M-buffer from 3-D objects, other sources of data can be written to the M-buffer or combined with data residing in the M-buffer. For example, data can be rendered to the M-buffer from stereoscopic images, cyber-scanned images, or images taken with range-scanning cameras or other cameras or image generating devices that are capable of generating images having both color and depth information. Similarly, data from images stored in various other formats that include both color and depth information such as RLA and RPF pixel formats can be converted into M-buffer data. Data from two or more M-buffers can be combined and resolved to composite the objects independently stored in each of the M-buffers.

Accordingly, these and other embodiments of the invention are within the scope of the following claims.

What is claimed is:

1. A method for creating a motion buffer to store the local properties of one or more scan-converted 3-D objects, comprising:

receiving one or more 3-D objects, wherein each 3-D object comprises one or more object primitives;

scan-converting each 3-D object's one or more object primitives into a plurality of pixel fragments corresponding to a plurality of pixels in a 2-D scene, wherein each pixel fragment is configured to store the local properties of a scan-converted object primitive including the object primitive's local color, depth, coverage, transfer mode, rate of change of depth with time, and surface geometry information, wherein the surface geometry information comprises spatial information about the object primitive's surface; and inserting each of the pixel fragments into the motion buffer for subsequent composition to the 2-D scene.

2. The method of claim 1, further comprising inserting each of the pixel fragments into the motion buffer in depth sorted order.

3. The method of claim 1, further comprising storing the motion buffer as a plurality of linked lists corresponding to a plurality of pixels in the 2-D scene, wherein each link in a linked list comprises a pixel fragment having a pointer to the next pixel fragment, if any, in the linked list.

4. A method for compositing one or more scan-converted 3-D objects to a 2-D scene, comprising:

receiving a motion buffer, the motion buffer containing the rendered local properties of the one or more scan-converted 3-D objects including each scan-converted 3-D object's color, depth, coverage, transfer mode, rate of change of depth with time, and surface geometry information, wherein the surface geometry information comprises spatial information about the scan-converted object's surface; and resolving the motion buffer by using the information stored in the motion buffer to composite the one or more scan-converted 3-D objects to the 2-D scene.

5. The method of claim 4, wherein resolving the motion buffer further comprises blending, on a per pixel basis and in depth sorted order, the color of each of the one or more 3-D objects to the color in the 2-D scene using the transfer mode of each of the one or more 3-D objects.

6. The method of claim 4, wherein the motion buffer contains surface geometry information for each of the one or more 3-D objects and resolving the motion buffer further comprises using the surface geometry information to anti-alias the one or more 3-D objects composited to the 2-D scene.

7. The method of claim 6, wherein two or more of the 3-D objects intersect over an output buffer pixel in the 2-D scene, further comprising:

determining the number of regions in the output buffer pixel in which the one or more intersecting 3-D objects are uniquely layered, and the relative coverage of each uniquely layered region;

determining a blended color for each uniquely layered region by blending in depth sorted order the color of each of the one or more 3-D objects with the color of the output buffer pixel according to each 3-D object's transfer mode; and painting the output buffer pixel with a weighted average of the blended colors determined for each uniquely layered region, wherein the weight assigned to the blended color of a uniquely layered region is determined by the relative coverage of that region.

8. The method of claim 4, wherein the motion buffer contains surface geometry information for the one or more 3-D objects and resolving the motion buffer further comprises using the surface geometry information to depth-of-field blur the one or more 3-D objects composited to the 2-D scene.

9. The method of claim 8, further comprising:

using the depth and surface geometry information for the one or more 3-D objects to extend, on an output buffer pixel basis, the surfaces of the one or more 3-D objects into an extended output buffer pixel;

determining whether the extended surfaces of two or more of the 3-D objects intersect over the extended output buffer pixel; and blending the colors of the one or more 3-D objects with the color of the output buffer pixel as if two or more of the 3-D objects intersected over the output butter pixel whenever the extended surfaces of two or more of the 3-D objects intersect over the extended output buffer pixel.

10. The method of claim 4, wherein the motion buffer contains surface geometry information for the one or more 3-D objects and resolving the motion buffer further comprises using the surface geometry information to anti-alias and depth-of-field blur the one or more 3-D objects composited to the 2-D scene.

11. The method of claim 4, wherein the motion buffer contains the rate of change of depth for each of the one or more 3-D objects, and resolving the motion buffer further comprises using the rate of change of depth for each of the one or more 3-D objects to motion-blur the one or more 3-D objects composited to the 2-D scene.

12. The method of claim 11, wherein the surfaces of two or more of the 3-D objects pass through each other over an output buffer pixel in the 2-D scene during a shutter interval, further comprising:

determining the number of time periods during the shutter interval in which the one or more 3-D objects are uniquely layered, and the duration of each uniquely layered time period;

determining a blended color for each uniquely layered time period by blending in depth sorted order the color of each of the one or more 3-D objects with the color of the output buffer pixel according to each of the one or more 3-D objects' transfer modes; and painting the output buffer pixel with a weighted average of the blended colors for each uniquely layered time period, wherein the weight assigned to the blended color of a uniquely layered time period is determined by the duration of that time period.

13. The method of claim 4, wherein the motion buffer contains the rate of change of depth and surface geometry information for the one or more 3-D objects, and resolving the motion buffer further comprises using the rate of change of depth and surface geometry information for the one or more 3-D objects to anti-alias and motion-blur the one or more 3-D objects composited to the 2-D scene.

14. The method of claim 13, wherein the surfaces of two or more of the 3-D objects intersect and pass through each other over an output buffer pixel in the 2-D scene during a shutter interval, further comprising:

dividing the area of the output buffer pixel and the shutter interval into a number of uniquely layered space-time regions, wherein for each uniquely layered space-time region the surfaces of the one or more 3-D objects are uniquely layered over a portion of the output buffer pixel for a portion of the shutter interval;

determining the number and volume of each uniquely layered space-time region, wherein the volume of a uniquely layered space-time region is calculated from the portion of the output buffer pixel and the portion of the shutter interval occupied byte space-time region;

determining a blended color for each uniquely layered space-time region by blending in depth sorted order the color of each of the one or more 3-D objects stored in the motion buffer with the color of the output buffer pixel according to each object's transfer mode; and painting the output buffer pixel with a weighted average of the blended colors for each uniquely layered space-time region, wherein the weight assigned to the blended color of a uniquely layered space-time region is determined by the volume of that uniquely layered space-time region.

15. The method of claim 4, wherein the motion buffer contains the rate of change of depth and surface geometry information for the one or more 3-D objects, and resolving the motion buffer further comprises using the rate of change of depth and surface geometry information for the one or more 3-D objects to motion-blur and depth-of-field blur the one or more 3-D objects while composited to the 2-D scene.

16. The method of claim 4, wherein the motion buffer contains the rate of change of depth and surface geometry information for the one or more 3-D objects, and resolving the motion buffer further comprises using the rate of change of depth and surface geometry information for the one or more 3-D objects to anti-alias, motion-blur and depth-of-field blur the one or more 3-D objects composited to the 2-D scene.

17. A method for rendering a plurality of scan-converted 3-D objects to a 2-D scene, comprising:

splitting the plurality of scan-converted 3-D objects into one or more object clusters;

rendering all non-simple object clusters to a motion buffer, the motion buffer containing the rendered local properties of the one or more scan-converted 3-D objects including each scan-converted 3-D object's color, depth, coverage, transfer mode, rate of change of depth with time and surface geometry information; and resolving the motion buffer to composite the non-simple object clusters to the 2-D scene.

18. The method of claim 17, further comprising rendering all simple object clusters directly to the 2-D scene.

19. The method of claim 17, further comprising rendering all simple object clusters to the motion buffer before resolving the motion buffer.

20. The method of claim 17, further comprising adding to the contents of the motion buffer the contents of a second motion buffer containing one or more separately rendered 3-D objects before resolving the motion buffer.

21. A computer program product, implemented on a machine readable medium, for creating a motion buffer to store the local properties of one or more 3-D objects, the computer program product comprising instructions operable to cause a programmable processor to;

receive one or more 3-D objects, wherein each 3-D object comprises one or more object primitives;

scan-convert each 3-D object's one or more object primitives into a plurality of pixel fragments corresponding to a plurality of pixels in a 2-D scene, wherein each pixel fragment is configured to store the local properties of a scan-converted abject primitive including the object primitive's local color, depth, coverage, transfer mode, primitive's rate of change of depth with time, and surface geometry information, wherein the surface geometry information comprises spatial information about the object primitive's surface; and insert each of the pixel fragments into the motion buffer for subsequent composition to the 2-D scene.

22. The computer program product of claim 21, further comprising instructions operable to cause a programmable processor to insert each of the pixel fragments into the motion buffer in depth sorted order.

23. The computer program product of claim 21, further comprising instructions operable to cause a programmable processor to store the motion buffer as a plurality of linked lists corresponding to a plurality of pixels in the 2-D scene, wherein each link in a linked list comprises a pixel fragment having a pointer to the next pixel fragment, if any, in the linked list.

24. A computer program product, implemented on a machine readable medium, for compositing one or more scan-converted 3-D objects to a 2-D scene, the computer program product comprising instructions operable to cause a programmable processor to:

receive a motion buffer, the motion buffer containing the rendered local properties of the one or more scan-converted 3-D objects including each scan-converted 3-D object's color, depth, coverage, transfer mode, each scan-converted 3-D object's rate of change of depth with time, and surface geometry information, wherein the surface geometry information comprises spatial information about the scan-converted 3-D object's surface; and resolve the motion buffer by using the information stored in the motion buffer to composite the one or more scan-converted 3-D objects to the 2-D scene.

25. The computer program product of claim 24, wherein the instructions to resolve the motion buffer further comprises instructions to blend, on a per pixel basis and in depth sorted order, the color of each of the one or more 3-D objects to the color in the 2-D scene using the transfer mode of each of the one or more 3-D objects.

26. The computer program product of claim 24, wherein the motion buffer contains surface geometry information for each of the one or more 3-D objects and the instructions to resolve the motion buffer further comprises instructions to use the surface geometry information to anti-alias the one or more 3-D objects composited to the 2-D scene.

27. The computer program product of claim 26, wherein two or more of the 3-D objects intersect over an output buffer pixel in the 2-D scene, further comprising instructions operable to cause a programmable processor to:
 determine the number of regions in the output buffer pixel in which the one or more intersecting 3-D objects are uniquely layered, and the relative coverage of each uniquely layered region;
 determine a blended color for each uniquely layered region by blending in depth sorted order the color of each of the one or more 3-D objects with the color of the output buffer pixel according to each 3-D object's transfer mode; and
 paint the output buffer pixel with a weighted average of the blended colors determined for each uniquely layered region, wherein the weight assigned to the blended color of a uniquely layered region is determined by the relative coverage of that region.

28. The computer program product of claim 24, wherein the motion buffer contains surface geometry information for the one or more 3-D objects and the instructions to resolve the motion buffer further comprises instructions to depth-of-field blur the one or more 3-D objects composited to the 2-D scene.

29. The computer program product of claim 24, wherein the motion buffer contains the surface geometry information for the one or more 3-D objects and the instructions to resolve the motion buffer further comprises instructions to use the surface geometry information to anti-alias and depth-of field blur the one or more 3-D objects composited to the 2-D scene.

30. The computer program product of claim 24, wherein the motion buffer contains the rate of change of depth for each of the one or more 3-D objects, and the instructions to resolve the motion buffer further comprises instructions to use the rate of change of depth for each of the one or more 3-D objects to motion-blur the one or more 3-D objects composited to the 2-D scene.

31. The computer program product of claim 24, wherein the motion buffer contains the rate of change of depth and surface geometry information for the one or more 3-D objects, and the instructions to resolve the motion buffer further comprises instructions to use the rate of change of depth and surface geometry information for the one or more 3-D objects to anti-alias and motion-blur the one or more 3-D objects composited to the 2-D scene.

32. The computer program product of claim 24, wherein the motion buffer contains the rate of change of depth and surface geometry information for the one or more 3-D objects, and the instructions to resolve the motion buffer further comprises instruction to use the rate of change of depth and surface geometry information for the one or more 3-D objects to motion-blur and depth-of field blur the one or more 3-D objects composited to the 2-D scene.

33. The computer program product of claim 24, wherein the motion buffer contains the rate of change of depth and surface geometry information for the one or more 3-D objects, and the instructions to resolve the motion buffer further comprises instructions to use the rate of change of depth and surface geometry information for the one or more 3-D objects to anti-alias and motion-blur the one or more 3-D objects composited to the 2-D scene.

34. A computer program product, implemented on a machine readable medium, for compositing one or more scan-converted 3-D objects to a 2-D scene, the computer program product comprising instructions operable to cause a programmable processor to:
 receive a motion buffer, the motion buffer containing the rendered local properties of the one or more scan-converted 3-D objects including each scan-converted 3-D object's color, depth, coverage, transfer mode and surface geometry information; and to
 resolve the motion buffer by using the information stored in the motion buffer to composite and depth-of-field blur the one or more scan converted 3-D objects to the 2-D scene; wherein the instructions to depth-of-field blur the one or more scan-converted 3-D objects further comprises instructions to:
 use the depth and surface geometry information for the one or more 3-D objects to extend, on an output buffer pixel basis, the surfaces of the one or more 3-D objects into an extended output buffer pixel;
 determine whether the extended surfaces of two or more of the 3-D objects intersect over the extended output buffer pixel; and
 blend the colors of the one or more 3-D objects with the color of the output buffer pixel as if two or more of the 3-D objects intersected over the output buffer pixel whenever the extended surfaces of two or more of the 3-D objects intersect over the extended output buffer pixel.

35. A computer program product, implemented on a machine readable medium, for compositing one or more scan-converted 3-D objects to a 2-D scene, wherein the surfaces of two or more of the 3-D objects pass through each other over an output buffer pixel in the 2-D scene during a shutter interval, the computer program product comprising instructions operable to cause a programmable processor to:
 receive a motion buffer, the motion buffer containing the rendered local properties of the one or more scan-converted 3-D objects including each scan-converted 3-D object's color, depth, coverage, transfer mode and rate of change of depth with time; and to
 resolve the motion buffer by using the information stored in the motion buffer to composite and motion-blur the one or more scan-converted 3-D objects to the 2-D scene; wherein the instructions to motion-blur the one or more scan-converted 3-D objects further comprises instructions to:
 determine the number of time periods during the shutter interval in which the one or more 3-D objects are uniquely layered, and the duration of each uniquely layered time period; determine a blended color for each uniquely layered time period by blending in depth sorted order the color of each of the one or more 3-D objects with the color of the output buffer pixel according to each of the one or more 3-D objects' transfer modes; and
 paint the output buffer pixel with a weighted average of the blended colors for each uniquely layered time period, wherein the weight assigned to the blended color of a uniquely layered time period is determined by the duration of that time period.

36. A computer program product, implemented on a machine readable medium, for compositing one or more scan-converted 3-D objects to a 2-D scene, wherein the surfaces of two or more of the 3-D objects intersect and pass through each other over an output buffer pixel in the 2-D scene during a shutter interval, the computer program product comprising instructions operable to cause a programmable processor to:

receive a motion buffer, the motion buffer containing the rendered local properties of the one or more scan-converted 3-D objects including each scan-converted 3-D object's color, depth, coverage, transfer mode, rate of change of depth with time surface geometry information; and to resolve the motion buffer by using the information stored in the motion buffer to composite, anti-alias and motion-blur the one or more scan-converted 3-D objects to the 2-D scene; wherein the instruction to anti-alias and motion-blur the one or more scan-converted 3-D objects further comprises instructions to:

divide the area of the output buffer pixel and the shutter interval into a number of uniquely layered space-time regions, wherein for each uniquely layered space-time region the surfaces of the one or more 3-D objects are uniquely layered over a portion of the output buffer pixel for a portion of the shutter interval;

determine the number and volume of each uniquely layered space-time region, wherein the volume of a uniquely layered space-time region is calculated from the portion of the output buffer pixel and the portion of the shutter interval occupied by the space-time region;

determine a blended color for each uniquely layered space-time region by blending in depth sorted order the color of each of the one or more 3-D objects stored in the motion buffer with the color of the output buffer pixel according to each object's transfer mode; and paint the output buffer pixel with a weighted average of the blended colors for each uniquely layered space-time region, wherein the weight assigned to the blended color of a uniquely layered space-time region is determined by the volume of that uniquely layered space-time region.

37. A computer program product, implemented on a machine readable medium, far rendering a plurality of scan-converted 3-D objects to a 2-D scene, the computer program product comprising instructions operable to cause a programmable processor to:

split the plurality of scan-converted 3-D objects into one or more object clusters;

render all non-simple object clusters to a motion buffer, the motion buffer containing the rendered local properties of the one or more scan-converted 3-D objects including each scan-converted 3-D object's color, depth, coverage, transfer mode, rate of change of depth with time and surface geometry information; and resolve the motion buffer to composite the non-simple object clusters to the 2-D scene.

38. The computer program product of claim 37, further comprising instructions operable to cause the programmable processor to render all simple and object clusters directly to the 2-D scene.

39. The computer program product of claim 37, further comprising instructions operable to cause the programmable processor to render all simple and object clusters to the motion buffer before resolving the motion buffer.

40. The computer program product of claim 37, further comprising instructions operable to cause the programmable processor to add to the contents of the motion buffer the contents of a second motion buffer containing one or more separately rendered 3-D objects before resolving the motion buffer.

41. A computer system comprising:

a display device for displaying information to a user;

a user input device for providing user input to the computer system;

at least one programmable processor coupled to receive data and instructions from, and to transmit data and instructions to at least one of a memory, the user input device or the display device, wherein the memory stores instructions executable by the at least one programmable processor for creating a motion buffer to store the local properties of one or more scan-converted 3-D objects, the instructions being operable to cause the at least one programmable processor to:

receive one or more 3-D objects, wherein each 3-D object comprises one or more object primitives;

scan-convert each 3-D object's one or more object primitives into a plurality of pixel fragments corresponding to a plurality of pixels in a 2-D scene, wherein each pixel fragment is configured to store the local properties of a scan-converted object primitive including the object primitive's local color, depth, coverage, transfer mode, rate of change of depth with time, and surface geometry information, wherein the surface geometry information comprises spatial information about the object primitive's surface; and insert each of the pixel fragments into the motion buffer for subsequent composition to the 2-D scene.

42. The computer system of claim 41, wherein the system is programmed to provide a graphical user interface through which computer programs running on the system interact with users.

43. The computer system of claim 41, wherein the instructions stored in the memory further comprise instructions operable to cause the at least one programmable processor to insert each of the pixel fragments into the motion buffer in depth sorted order.

44. The computer system of claim 41, wherein the instructions stored in the memory further comprise instructions operable to cause the at least one programmable processor to store the motion buffer as a plurality of linked lists corresponding to a plurality of pixels in the 2-D scene, wherein each link in the linked list comprises a pixel fragment having a pointer to the next pixel fragment, if any, in the linked list.

45. A computer system comprising:

a display device for displaying information to a user;

a user input device for providing user input to the computer system;

at least one programmable processor coupled to receive data and instructions from, and to transmit data and instructions to at least one of a memory, the user input device or the display device, wherein the memory stores instructions executable by the at least one programmable processor and operable to cause the at least one programmable processor to:

receive a motion buffer, the motion buffer containing the rendered local properties of one or more scan-converted 3-D objects including each scan-converted 3-D object's color, depth, coverage, transfer mode, rate of change of depth with time, and surface geometry information, wherein the surface geometry information comprises spatial information about the scan-converted object's surface; and resolve the motion buffer by using the information stored in the motion buffer to composite the one or more scan-converted 3-D objects to the 2-D scene.

46. The computer system of claim 45, wherein the instructions stored in the memory further comprise instructions operable to cause the at least one programmable processor to resolve the motion buffer by blending, on a per pixel basis and in depth sorted order, the color of each of the one or more 3-D objects to the color in the 2-D scene using the transfer mode of each of the one or more 3-D objects.

47. The computer system of claim 45, wherein two or more of the 3-D objects intersect over an output buffer pixel in the 2-D scene, and the instructions stored in the memory further comprise instructions operable to cause the at least one programmable processor to:
- determine the number of regions in the output buffer pixel in which the one or more intersecting 3-D objects are uniquely layered, and the relative coverage of each uniquely layered region;
- determine a blended color for each uniquely layered region by blending in depth sorted order the color of each of the one or more 3-D objects with the color of the output buffer pixel according to each 3-D object's transfer mode; and
- paint the output buffer pixel with a weighted average of the blended colors determined for each uniquely layered region, wherein the weight assigned to the blended color of a uniquely layered region is determined by the relative coverage of that region.

48. The computer system of claim 45, wherein the instructions stored in the memory further comprise instructions operable to cause the at least one programmable processor to:
- use the depth and surface geometry information for the one or more 3-D objects to extend, on an output buffer pixel basis, the surfaces of the one or more 3-D objects into an extended output buffer pixel;
- determine whether the extended surfaces of two or more of the 3-D objects intersect over the extended output buffer pixel; and
- blend the colors of the one or more 3-D objects with the color of the output buffer pixel as if two or more of the 3-D objects intersected over the output buffer pixel whenever the extended surfaces of two or more of the 3-D objects intersect over the extended output buffer pixel.

49. The computer system of claim 45, wherein the instructions stored in the memory further comprise instructions operable to cause the at least one programmable processor to resolve the motion buffer using the rate of change of depth for each of the one or more 3-D objects to motion-blur the one or more 3-D objects composited to the 2-D scene.

50. The computer system of claim 45, wherein the surfaces of two or more of the 3-D objects pass through each other over an output buffer pixel in the 2-D scene during a shutter interval, and the instructions stored in the memory further comprise instructions operable to cause the at least one programmable processor to:
- determine the number of time periods during the shutter interval in which the one or more 3-D objects are uniquely layered, and the duration of each uniquely layered time period;
- determine a blended color for each uniquely layered time period by blending in depth sorted order the color of each of the one or more 3-D objects with the color of the output buffer pixel according to each of the one or more 3-D objects' transfer modes; and
- paint the output buffer pixel with a weighted average of the blended colors for each uniquely layered time period, wherein the weight assigned to the blended color of a uniquely layered time period is determined by the duration of that time period.

51. The computer system of claim 45, wherein the surfaces of two or more of the 3-D objects intersect and pass through each other over an output buffer pixel in the 2-D scene during a shutter interval, and the instructions stored in the memory further comprise instructions operable to cause the at least one programmable processor to:
- divide the area of the output buffer pixel and the shutter interval into a number of uniquely layered space-time regions, wherein for each uniquely layered space-time region the surfaces of the one or more 3-D objects are uniquely layered over a portion of the output buffer pixel for a portion of the shutter interval;
- determine the number and volume of each uniquely layered space-time region, wherein the volume of a uniquely layered space-time region is calculated from the portion of the output buffer pixel and the portion of the shutter interval occupied by the space-time region;
- determine a blended color for each uniquely layered space-time region by blending in depth sorted order the color of each of the one or more 3-D objects stored in the motion buffer with the color of the output buffer pixel according to each object's transfer mode; and
- paint the output buffer pixel with a weighted average of the blended colors for each uniquely layered space-time region, wherein the weight assigned to the blended color of a uniquely layered space-time region is determined by the volume of that uniquely layered space-time region.

52. The computer system of claim 45, wherein the instructions stored in the memory further comprise instructions operable to cause the at least one programmable processor to render all simple object clusters directly to the 2-D scene.

53. The computer system of claim 45, wherein the instructions stored in the memory further comprise instructions operable to cause the at least one programmable processor to render all simple object clusters to the motion buffer before resolving the motion buffer.

54. The computer system of claim 45, wherein the instructions stored in the memory further comprise instructions operable to cause the at least one programmable processor to add to the contents of the motion buffer the contents of a second motion buffer containing one or more separately rendered 3-D objects before resolving the motion buffer.

55. A computer system comprising:
- a display device for displaying information to a user;
- a user input device for providing user input to the computer system;
- at least one programmable processor coupled to receive data and instructions from, and to transmit data and instructions to at least one of a memory, the user input device or the display device, wherein the memory stores instructions executable by the at least one programmable processor and operable to cause the at least one programmable processor to:
  - split the plurality of scan-converted 3-D objects into one or more object clusters;
  - render all non-simple object clusters to a motion buffer, the motion buffer containing the rendered local properties of the one or more scan-converted 3-D objects including each scan-converted 3-D object's color, depth, coverage, transfer mode, rate of change of depth and surface geometry information; and
  - resolve the motion buffer to composite the non-simple object clusters to the 2-D scene.

* * * * *

UNITED STATES PATENT AND TRADEMARK OFFICE
CERTIFICATE OF CORRECTION

PATENT NO. : 7,453,459 B2
APPLICATION NO. : 10/080525
DATED : November 18, 2008
INVENTOR(S) : Jonathan Shekter It is certified that error appears in the above-identified patent and that said Letters Patent is hereby corrected as shown below:

Claim 8:
    column 12, line 38:
        delete "the motion buffer further comprises using the surface geometry information to depth-of-field blur the one or more 3-D objects composited to the 2-D scene.",
        and insert, after "resolving" on line 37 as a continuation --the motion buffer further comprises using the surface geometry information to depth-of-field blur the one or more 3-D objects composited to the 2-D scene.--

Claim 9:
    column 12, line 51:
        delete "butter", and replace with --buffer--

Claim 14:
    column 13, line 40:
        delete "byte", and replace with --by the--

Claim 21:
    column 14, line 22:
        delete "more 3-D", and replace with --more scan-converted 3-D-- column 14, line 24:
        delete "to;", and replace with --to:-- column 14, line 31:
        delete "abject", and replace with --object--

Claim 29:
    column 15, line 40:
        delete "depth-of field", and replace with --depth-of-field--

Claim 32:
    column 15, line 61:
        delete "instruction", and replace with --instructions-- column 15, line 63:
        delete "depth-of field", and replace with --depth-of-field-- column 16, line 4:
        delete "anti-alias and motion-blur",
        and replace with --anti-alias, motion-blur and depth-of-field blur--

UNITED STATES PATENT AND TRADEMARK OFFICE
CERTIFICATE OF CORRECTION

PATENT NO. : 7,453,459 B2
APPLICATION NO. : 10/080525
DATED : November 18, 2008
INVENTOR(S) : Jonathan Shekter It is certified that error appears in the above-identified patent and that said Letters Patent is hereby corrected as shown below:

Claim 34:
    column 16, line 18:
        delete "scan converted", and replace with --scan-converted--

Claim 35:
    column 16, line 56:
        insert paragraph break after "layered time period;"

Claim 36:
    column 17, line 11:
        delete "time surface", and replace with --time and surface--

Claim 37:
    column 17, line 41:
        delete "far", and replace with --for--

Claim 38:
    column 17, line 57:
        delete "simple and object", and replace with --simple object--

Claim 39:
    column 17, line 61:
        delete "simple and object", and replace with --simple object--

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,453,459 B2 Page 1 of 1
APPLICATION NO. : 10/080525
DATED : November 18, 2008
INVENTOR(S) : Jonathan Shekter It is certified that error appears in the above-identified patent and that said Letters Patent is hereby corrected as shown below:

Column 14, line 33, claim 21, before "primitive's", insert --the object--

Column 15, line 34, claim 28, before "depth-of-field", insert --use the surface geometry information to--

Signed and Sealed this

Eighteenth Day of May, 2010

David J. Kappos
*Director of the United States Patent and Trademark Office*